(12) United States Patent
Matsuda et al.

(10) Patent No.: US 8,588,651 B2
(45) Date of Patent: Nov. 19, 2013

(54) ROTARY DRIVE DEVICE WITH A PLANETARY GEAR MECHANISM TO DRIVE A ROTARY BODY, AND IMAGE FORMING APPARATUS INCLUDING THE SAME

(75) Inventors: Hiromichi Matsuda, Kanagawa (JP); Katsuaki Miyawaki, Kanagawa (JP); Tetsuo Watanabe, Kanagawa (JP); Nobuo Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 188 days.

(21) Appl. No.: 13/067,231

(22) Filed: May 18, 2011

(65) Prior Publication Data
US 2011/0293328 A1 Dec. 1, 2011

(30) Foreign Application Priority Data
May 25, 2010 (JP) .................. 2010-119182

(51) Int. Cl.
*G03G 15/00* (2006.01)
(52) U.S. Cl.
USPC ............................................. 399/167
(58) Field of Classification Search
USPC ............................................. 399/167
See application file for complete search history.

(56) References Cited

U.S. PATENT DOCUMENTS

| | | | |
|---|---|---|---|
| 4,882,943 A | 11/1989 | Pipon et al. | |
| 4,908,661 A | 3/1990 | Iwata et al. | |
| 5,008,711 A | 4/1991 | Sakamoto et al. | |
| 5,300,952 A | 4/1994 | Wada et al. | |
| 5,462,371 A | 10/1995 | Beretta et al. | |
| 5,599,645 A | 2/1997 | Tamiya et al. | |
| 5,678,161 A | 10/1997 | Kurotaka et al. | |
| 5,708,938 A | 1/1998 | Takeuchi et al. | |
| 5,828,926 A | 10/1998 | Iwata et al. | |
| 5,848,329 A | 12/1998 | Aoyama et al. | |
| 5,875,380 A | 2/1999 | Iwata et al. | |
| 5,962,783 A | 10/1999 | Iwata et al. | |

(Continued)

FOREIGN PATENT DOCUMENTS

| | | |
|---|---|---|
| CN | 1782469 A | 6/2006 |
| EP | 1950453 A2 | 7/2008 |

(Continued)

OTHER PUBLICATIONS

European Search Report dated Oct. 7, 2011.

(Continued)

*Primary Examiner* — Quana M Grainger
(74) *Attorney, Agent, or Firm* — Harness, Dickey & Pierce, P.L.C.

(57) ABSTRACT

A rotary drive device to drive a rotary body included in an image forming apparatus. The rotary drive device includes a drive source and a planetary gear mechanism to control torque from the drive source. The planetary gear mechanism includes a sun gear rotated by the torque, an annular gear coaxial to the sun gear and having inward-facing teeth, multiple planetary gears provided within the annular gear, and a carrier rotatable coaxially to the sun gear and the annular gear to rotatably support the multiple planetary gears. The annular gear is formed by injecting molten resin into a mold having a cylindrical cavity with teeth shapes along an inner circumference of the cavity from multiple pin gates provided to the mold at equal intervals along a circumference of the cavity. A number of pin gates is a non-integer multiple of a number of planetary gears.

10 Claims, 8 Drawing Sheets

(56) References Cited

U.S. PATENT DOCUMENTS

| | | | |
|---|---|---|---|
| 6,097,910 A | 8/2000 | Sasaki et al. | |
| 6,108,508 A | 8/2000 | Takeuchi et al. | |
| 6,128,459 A | 10/2000 | Iwata et al. | |
| 6,142,690 A | 11/2000 | Yoshimura et al. | |
| 6,184,910 B1 | 2/2001 | Sasaki et al. | |
| 6,282,396 B1 | 8/2001 | Iwata et al. | |
| 6,324,374 B1 | 11/2001 | Sasamoto et al. | |
| 6,381,435 B2 | 4/2002 | Shinohara et al. | |
| 6,556,802 B2 | 4/2003 | Sasamoto et al. | |
| 6,757,512 B2 | 6/2004 | Miyawaki et al. | |
| 6,768,891 B2 | 7/2004 | Sasamoto et al. | |
| 6,941,096 B2 | 9/2005 | Matsuda et al. | |
| 6,941,102 B2 | 9/2005 | Sasamoto et al. | |
| 6,949,896 B2 | 9/2005 | Andoh et al. | |
| 6,996,357 B2 | 2/2006 | Matsuda et al. | |
| 7,027,751 B2 | 4/2006 | Miura et al. | |
| 7,054,585 B2 | 5/2006 | Sasamoto et al. | |
| 7,184,674 B2 | 2/2007 | Satoh et al. | |
| 7,203,431 B2 | 4/2007 | Shoji et al. | |
| 7,203,452 B2 | 4/2007 | Miyawaki et al. | |
| 7,251,444 B2 | 7/2007 | Matsuda et al. | |
| 7,257,339 B2 | 8/2007 | Yokoyama et al. | |
| 7,327,962 B2 | 2/2008 | Shoji et al. | |
| 7,327,972 B2 | 2/2008 | Matsuda et al. | |
| 7,343,119 B2 | 3/2008 | Matsuda et al. | |
| 7,343,126 B2 | 3/2008 | Miyawaki et al. | |
| 7,376,375 B2 | 5/2008 | Kobayashi et al. | |
| 7,386,262 B2 | 6/2008 | Okamura et al. | |
| 7,444,097 B2 | 10/2008 | Suzuki et al. | |
| 7,454,150 B2 | 11/2008 | Matsuda et al. | |
| 7,457,550 B2 | 11/2008 | Shoji et al. | |
| 7,509,074 B2 | 3/2009 | Yokoyama et al. | |
| 7,551,882 B2 | 6/2009 | Seto et al. | |
| 7,554,574 B2 | 6/2009 | Shoji et al. | |
| 7,587,157 B2 | 9/2009 | Matsuda et al. | |
| 7,643,767 B2 | 1/2010 | Seto et al. | |
| 7,684,740 B2 | 3/2010 | Matsuda et al. | |
| 7,693,466 B2 | 4/2010 | Miyawaki et al. | |
| 7,711,300 B2 | 5/2010 | Nakafuji et al. | |
| 7,711,301 B2 | 5/2010 | Takemoto et al. | |
| 7,738,813 B2 | 6/2010 | Yasutomi et al. | |
| 7,751,746 B2 | 7/2010 | Miyawaki et al. | |
| 7,778,555 B2 | 8/2010 | Shoji et al. | |
| 7,790,343 B2 | 9/2010 | Suzuki et al. | |
| 7,822,351 B2 | 10/2010 | Aoki et al. | |
| 7,831,185 B2 | 11/2010 | Masubuchi et al. | |
| 7,871,073 B2 | 1/2011 | Noguchi et al. | |
| 7,885,587 B2 | 2/2011 | Matsuda et al. | |
| 7,903,269 B2 | 3/2011 | Nakagawa et al. | |
| 2001/0004425 A1 | 6/2001 | Shinohara et al. | |
| 2002/0031379 A1 | 3/2002 | Miyawaki et al. | |
| 2002/0044799 A1 | 4/2002 | Sasamoto et al. | |
| 2003/0185602 A1 | 10/2003 | Sasamoto et al. | |
| 2004/0086299 A1 | 5/2004 | Matsuda et al. | |
| 2004/0164691 A1 | 8/2004 | Andoh et al. | |
| 2004/0213605 A1 | 10/2004 | Sasamoto et al. | |
| 2004/0241276 A1* | 12/2004 | Miyasaka | 425/543 |
| 2005/0002054 A1 | 1/2005 | Shoji et al. | |
| 2005/0053388 A1 | 3/2005 | Yokoyama et al. | |
| 2005/0100374 A1 | 5/2005 | Satoh et al. | |
| 2005/0244197 A1 | 11/2005 | Sasamoto et al. | |
| 2005/0249524 A1 | 11/2005 | Matsuda et al. | |
| 2005/0281596 A1 | 12/2005 | Nakagawa et al. | |
| 2005/0286916 A1 | 12/2005 | Nakazato et al. | |
| 2006/0053917 A1 | 3/2006 | Asari et al. | |
| 2006/0088338 A1 | 4/2006 | Matsuda et al. | |
| 2006/0110189 A1 | 5/2006 | Matsuda et al. | |
| 2006/0133873 A1 | 6/2006 | Andoh et al. | |
| 2006/0153604 A1 | 7/2006 | Matsuda et al. | |
| 2006/0165442 A1 | 7/2006 | Kobayashi et al. | |
| 2006/0182451 A1 | 8/2006 | Shoji et al. | |
| 2006/0182471 A1 | 8/2006 | Okamura et al. | |
| 2006/0184258 A1 | 8/2006 | Matsuda et al. | |
| 2006/0275056 A1 | 12/2006 | Matsuda et al. | |
| 2007/0008395 A1 | 1/2007 | Masubuchi et al. | |
| 2007/0126837 A1 | 6/2007 | Takahashi et al. | |
| 2007/0127934 A1 | 6/2007 | Shoji et al. | |
| 2007/0140728 A1 | 6/2007 | Miyawaki et al. | |
| 2007/0172257 A1 | 7/2007 | Matsuda et al. | |
| 2007/0212126 A1 | 9/2007 | Seto et al. | |
| 2007/0212129 A1 | 9/2007 | Takemoto et al. | |
| 2007/0218386 A1 | 9/2007 | Suzuki et al. | |
| 2007/0231022 A1 | 10/2007 | Yokoyama et al. | |
| 2007/0238571 A1* | 10/2007 | Sugitani | 475/227 |
| 2008/0008505 A1 | 1/2008 | Seto et al. | |
| 2008/0013972 A1 | 1/2008 | Matsuda | |
| 2008/0025770 A1* | 1/2008 | Burnett | 399/324 |
| 2008/0069610 A1 | 3/2008 | Nakafuji et al. | |
| 2008/0118275 A1 | 5/2008 | Yasutomi et al. | |
| 2008/0170884 A1 | 7/2008 | Matsuda | |
| 2008/0175612 A1 | 7/2008 | Oikawa et al. | |
| 2008/0182708 A1 | 7/2008 | Kato | |
| 2008/0212998 A1 | 9/2008 | Miyawaki et al. | |
| 2008/0219702 A1 | 9/2008 | Tsukamoto et al. | |
| 2008/0232880 A1 | 9/2008 | Noguchi et al. | |
| 2008/0261768 A1 | 10/2008 | Miyawaki et al. | |
| 2008/0303202 A1 | 12/2008 | Noguchi et al. | |
| 2009/0003904 A1 | 1/2009 | Yasutomi et al. | |
| 2009/0026689 A1 | 1/2009 | Noguchi et al. | |
| 2009/0052912 A1 | 2/2009 | Soji et al. | |
| 2009/0074431 A1 | 3/2009 | Aoki et al. | |
| 2009/0169225 A1 | 7/2009 | Murata et al. | |
| 2009/0190972 A1 | 7/2009 | Ohkubo et al. | |
| 2009/0207461 A1 | 8/2009 | Hodoshima et al. | |
| 2009/0220277 A1 | 9/2009 | Andoh et al. | |
| 2009/0238588 A1 | 9/2009 | Matsuda et al. | |
| 2009/0238613 A1 | 9/2009 | Ueda et al. | |
| 2009/0263158 A1 | 10/2009 | Murata et al. | |
| 2009/0322020 A1 | 12/2009 | Iwata et al. | |
| 2009/0324262 A1 | 12/2009 | Matsuda et al. | |
| 2010/0017019 A1 | 1/2010 | Andoh et al. | |
| 2011/0013919 A1 | 1/2011 | Matsuda | |
| 2012/0196720 A1* | 8/2012 | Miyawaki et al. | 475/345 |

FOREIGN PATENT DOCUMENTS

| | | |
|---|---|---|
| JP | 2007-212806 A | 8/2007 |
| JP | 2010/101340 | 5/2010 |
| WO | WO 2009/059421 | 5/2009 |

OTHER PUBLICATIONS

Chinese Office Action dated Jun. 25, 2013 for corresponding Chinese Application No. 201110130903.8.

* cited by examiner

ROTARY DRIVE DEVICE WITH A PLANETARY GEAR MECHANISM TO DRIVE A ROTARY BODY, AND IMAGE FORMING APPARATUS INCLUDING THE SAME

PRIORITY STATEMENT

The present patent application claims priority from Japanese Patent Application No. 2010-119182, filed on May 25, 2010, in the Japan Patent Office, which is hereby incorporated herein by reference in its entirety.

BACKGROUND

1. Technical Field

Illustrative embodiments described in this patent specification generally relate to a rotary drive device that drives a rotary body and an image forming apparatus including the rotary drive device.

2. Description of the Related Art

Related-art image forming apparatuses, such as copiers, printers, facsimile machines, and multifunction devices having two or more of copying, printing, and facsimile functions, typically form a toner image on a recording medium (e.g., a sheet of paper, etc.) according to image data using an electrophotographic method. In such a method, for example, a charger charges a surface of an image carrier (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor onto a sheet of recording media; and a fixing device applies heat and pressure to the sheet bearing the toner image to fix the toner image onto the sheet. The sheet bearing the fixed toner image is then discharged from the image forming apparatus.

There are many rotary bodies used in the image forming apparatus. Examples of the rotary bodies include, but are not limited to, the photoconductor, a drive roller that drives belt members such as an intermediate transfer belt and a transfer belt included in the transfer device, and a conveyance roller that conveys the sheet or the like.

A change in rotary speed of the photoconductor or the intermediate transfer belt for example, causes jitter or uneven image density in a resultant image. Consequently, continuous speed variation in the photoconductor or the intermediate transfer belt at a certain frequency periodically causes uneven image density throughout the resultant image, resulting in stripes, or banding. In addition, speed variation in the photoconductor shifts a sub-scanning position of an exposure line from a writing system and a sub-scanning position upon primary transfer of a toner image from the photoconductor onto the intermediate transfer belt. Further, speed variation in the intermediate transfer belt shifts a sub-scanning position upon secondary transfer of the toner image from the intermediate transfer belt onto the sheet as well as upon primary transfer of the toner image. Thus, speed variation in the photoconductor and the intermediate transfer belt considerably degrades image quality.

Therefore, steady, consistent driving of these bodies is important for good imaging, and accordingly, there is a longstanding need for a mechanism that transmits torque with less rotational fluctuation from a drive source to a target rotary body to be driven to meet the requirement for highly accurate driving of the rotary body. This requirement may be met by the materials used for the constituent rotary parts.

Further, in order to achieve sufficient durability for plastic gears, use of a planetary gear mechanism has been proposed. The planetary gear mechanism includes a sun gear rotated by torque from a drive source, an annular gear having inward-facing teeth and provided coaxially to the sun gear, multiple planetary gears provided within the annular gear at equal intervals in a circumferential direction of the annular gear to respectively engage the sun gear and the annular gear, and a carrier rotatable coaxially to the sun gear and the annular gear to rotatably support the planetary gears. The torque from the drive source rotates the sun gear so that the multiple planetary gears are rotated around their own axes. At the same time, the multiple planetary gears revolve around the sun gear within the annular gear to rotate the carrier. Torque generated by rotation of the carrier is transmitted to the rotary body via an output shaft that couples the carrier to the rotary body. Thus, use of the multiple planetary gears in the planetary gear mechanism diversifies rotational loads, thereby achieving the necessary durability.

Plastic gears manufactured by injection molding of molten resin have been used as drive transmission members that transmit torque from the drive source to the photoconductor or the intermediate transfer belt, each of which is required to be accurately driven. The plastic gears are superior to metal gears due to their higher self-lubricating property, lower noise during operation, lighter weight, superior corrosion resistance, and easier mass producibility. At the same time, however, plastic gears are inferior to the metal gears in terms of lower durability, lower dimensional accuracy, and lower rigidity.

In particular, the mold used for manufacturing the annular gear with injection molding includes upper and lower parts and a cavity formed between the upper and lower parts. The cavity is a cylindrical space having teeth shapes along an inner, circumference thereof. The molten resin is injected into the cavity, and is cooled and solidified to form the annular gear. The teeth shapes of the cavity are transferred onto the molten resin when solidified to form the inward-facing teeth of the resultant annular gear. Multiple pin gates through which the molten resin is injected into the cavity are provided to the upper part of the mold at equal intervals in a circumferential direction of the cavity. Accordingly, the molten resin can be evenly injected into the cavity from each of the pin gates.

However, because the molten resin injected from the pin gates into the cavity spreads radially around each of the pin gates, the farther the positions within the cavity are away from each of the pin gates, the longer it takes for the molten resin to reach them. Consequently, the amount of molten resin tends to be lacking around intermediate positions between each of the two adjacent pin gates, that is, the farthest positions from each of the pin gates, possibly causing deformation in the inward-facing teeth of the resultant annular gear. Such deformation in the teeth of the annular gear causes rotary transmission errors due to irregular engagement of the planetary gears and the annular gear, resulting in rotary speed fluctuation in the planetary gear mechanism. As a result, it is difficult to transmit the torque with less rotational fluctuation from the drive source to a target rotary body to be driven.

SUMMARY

In view of the foregoing, illustrative embodiments described herein provide an improved rotary drive device that reduces rotational fluctuation in a planetary gear mechanism, a method of forming an annular gear of the planetary gear mechanism, and an image forming apparatus including the rotary drive device.

At least one embodiment provides a rotary drive device to drive a rotary body included in an image forming apparatus. The rotary drive device includes a drive source and a planetary gear mechanism to control torque from the drive source. The planetary gear mechanism includes a sun gear rotated by the torque from the drive source, an annular gear coaxial to the sun gear and having inward-facing teeth, multiple planetary gears provided within the annular gear at equal intervals along a circumference of the annular gear, and a carrier rotatable coaxially to the sun gear and the annular gear to rotatably support the multiple planetary gears. The multiple planetary gears engage both the sun gear and the annular gear. The annular gear is formed by injecting molten resin into a mold having a cylindrical cavity with teeth shapes along an inner circumference of the cavity from multiple pin gates provided to the mold at equal intervals along a circumference of the cavity. A number of pin gates is a non-integer multiple of a number of planetary gears.

At least one embodiment provides an image forming apparatus including a rotary body and the rotary drive device described above.

Additional features and advantages of the illustrative embodiments will be more fully apparent from the following detailed description, the accompanying drawings, and the associated claims.

BRIEF DESCRIPTION OF THE DRAWINGS

A more complete appreciation of the illustrative embodiments described herein and the many attendant advantages thereof will be readily obtained as the same becomes better understood by reference to the following detailed description when considered in connection with the accompanying drawings, wherein.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

A description is now given of illustrative embodiments of the present invention with reference to drawings, wherein like reference numerals designate identical or corresponding parts throughout the several views.

A configuration and operations of an electrophotographic full-color printer serving as an image forming apparatus 100 according to illustrative embodiments is described in derail below. Although the image forming apparatus 100 described herein employs a tandem system and uses dry two-component developer, the configuration of the image forming apparatus 100 is not limited thereto.

Figure 1:
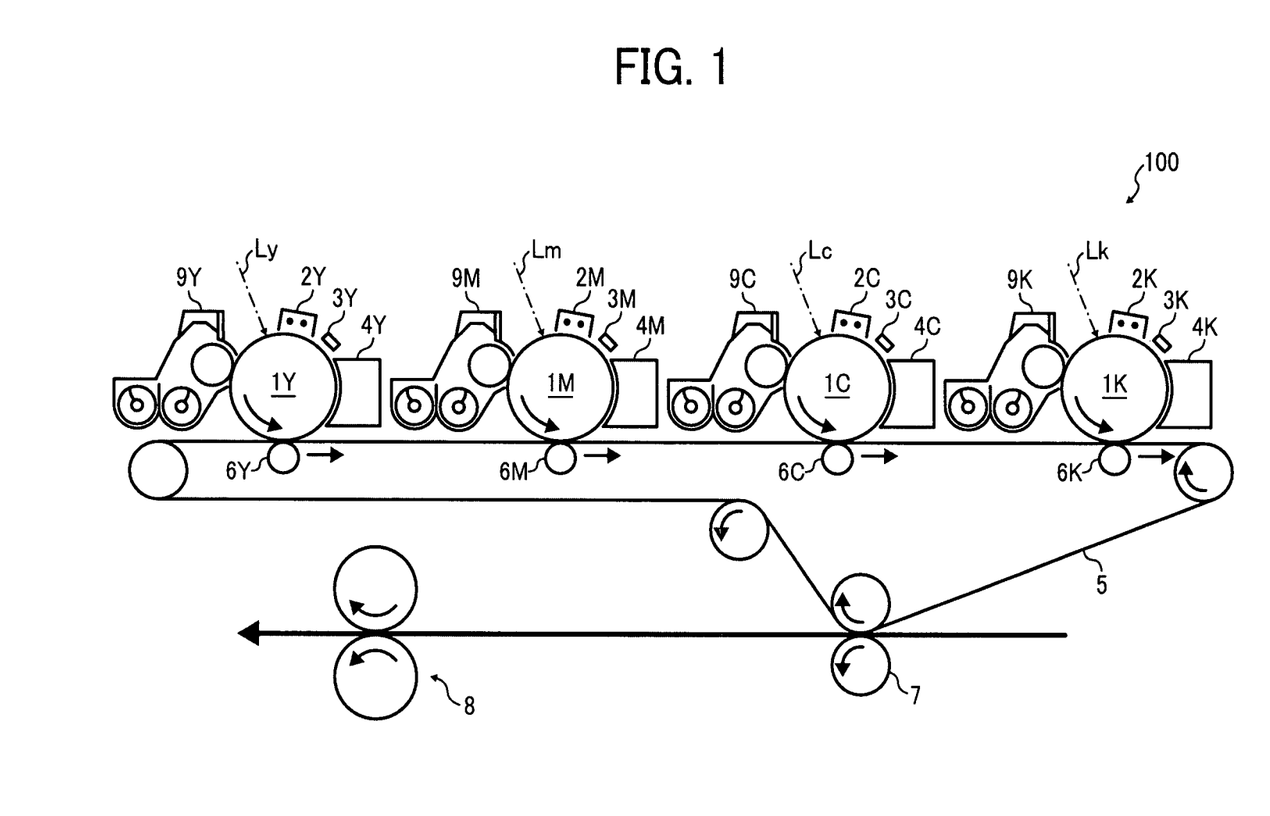
FIG. 1 is a vertical cross-sectional view illustrating an example of a configuration of an image forming part of an image forming apparatus according to illustrative embodiments.

FIG. 1 is a vertical cross-sectional view illustrating an example of a configuration of an image forming part of the image forming apparatus 100. The image forming apparatus 100 receives image data sent from an image reading unit, not shown, to form an image based on the image data.

The image forming apparatus 100 includes photoconductors 1Y, 1M, 1C, and 1K (hereinafter collectively referred to as photoconductors 1). Each of the photoconductors 1 has a rotary body serving as an image carrier for forming an image of a specific color, that is, yellow (Y), magenta (M), cyan (C), or black (K).

The photoconductors 1 are provided in contact with an intermediate transfer belt 5 composed of a seamless belt wound around multiple rollers including a drive roller, and are arranged side by side along a direction of rotation of the intermediate transfer belt 5.

Electrophotographic processing members such as chargers 2Y, 2M, 2C, and 2K (hereinafter collectively referred to as chargers 2), developing devices 9Y, 9M, 9C, and 9K (hereinafter coactively referred to as developing devices 9), cleaning devices 4Y, 4M, 4C, and 4K (hereinafter collectively referred to as cleaning devices 4), and neutralizing lamps 3Y, 3M, 3C, and 3K (hereinafter collectively referred to as neutralizing lamps 3) are provided around the photoconductors 1, respectively, in the order in which they come into play as processing proceeds. The photoconductors 1, the chargers 2, the neutralizing lamps 3, the cleaning devices 4, and the developing devices 9 for each color are formed together as a single integrated unit, respectively, serving as a process cartridge for each color detachably attachable to the image forming apparatus 100.

During full-color image formation, first, the photoconductors 1 are rotatively driven, and the chargers 2 evenly charge surfaces of the photoconductors 1, respectively. Then, an optical writing device, not shown, irradiates the charged surfaces of the photoconductors 1 with light beams Ly, Lm, Lc, and Lk (hereinafter collectively referred to as light beams L) based on image data to form electrostatic latent images of the respective colors on the surfaces of the photoconductors 1. The electrostatic latent images are developed by the developing devices 9 with toner of the respective colors. Specifically, a predetermined developing bias is applied to developing portions between the photoconductors 1 and developing rollers respectively included in the developing devices 9, so that toner of developer of the respective colors borne on the developing rollers is electrostatically attracted to the electrostatic latent images formed on the surfaces of the photoconductors 1. Accordingly, toner images of the respective colors are formed on the surfaces of the photoconductors 1.

The toner images thus formed on the surfaces of the photoconductors 1 are conveyed as the photoconductors 1 rotate to reach primary transfer positions where the photoconductors 1 contact the intermediate transfer belt 5, respectively. A predetermined bias voltage is applied from primary transfer rollers 6Y, 6M, 6C, and 6K (hereinafter collectively referred to as primary transfer rollers 6) to a back surface of the intermediate transfer belt 5 at the primary transfer positions. Accordingly, application of the predetermined bias voltage generates primary transfer magnetic fields at the primary transfer positions to attract the toner images formed on the surfaces of the photoconductors 1 to the intermediate transfer belt 5, thereby primarily transferring the toner images onto the intermediate transfer belt 5 from the surfaces of the photoconductors 1. Thus, the toner images of the respective colors are sequentially transferred onto the intermediate transfer belt 5 and superimposed one atop the other to form a full-color toner image on the intermediate transfer belt 5.

The full-color toner image thus formed on the intermediate transfer belt 5 is conveyed to a secondary transfer position opposite a secondary transfer roller 7 as the intermediate transfer belt 5 rotates. Meanwhile, a sheet of a recording medium is conveyed to the secondary transfer position at a predetermined timing by a pair of registration rollers, not shown.

The secondary transfer roller 7 applies a predetermined bias voltage to a back side of the sheet at the secondary transfer position so that a secondary transfer magnetic field is generated at the secondary transfer position. Accordingly, the full-color toner image is secondarily transferred onto the sheet from the intermediate transfer belt 5 by the secondary transfer magnetic field and a pressure applied at the secondary transfer position. The sheet having the transferred full-color toner image thereon is then conveyed to a fixing device 8 so that the full-color toner image is fixed to the sheet. The sheet having the fixed full-color image is then discharged from the image forming apparatus 100.

Figure 2:
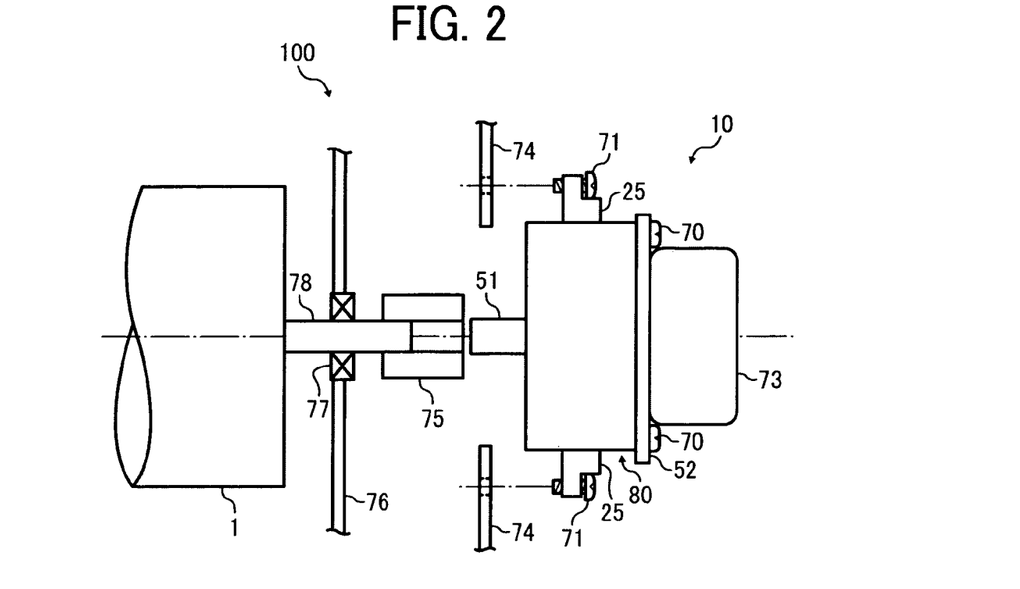
FIG. 2 is an exploded view illustrating an example of a configuration of a rotary drive device according to illustrative embodiments.
Figure 3:
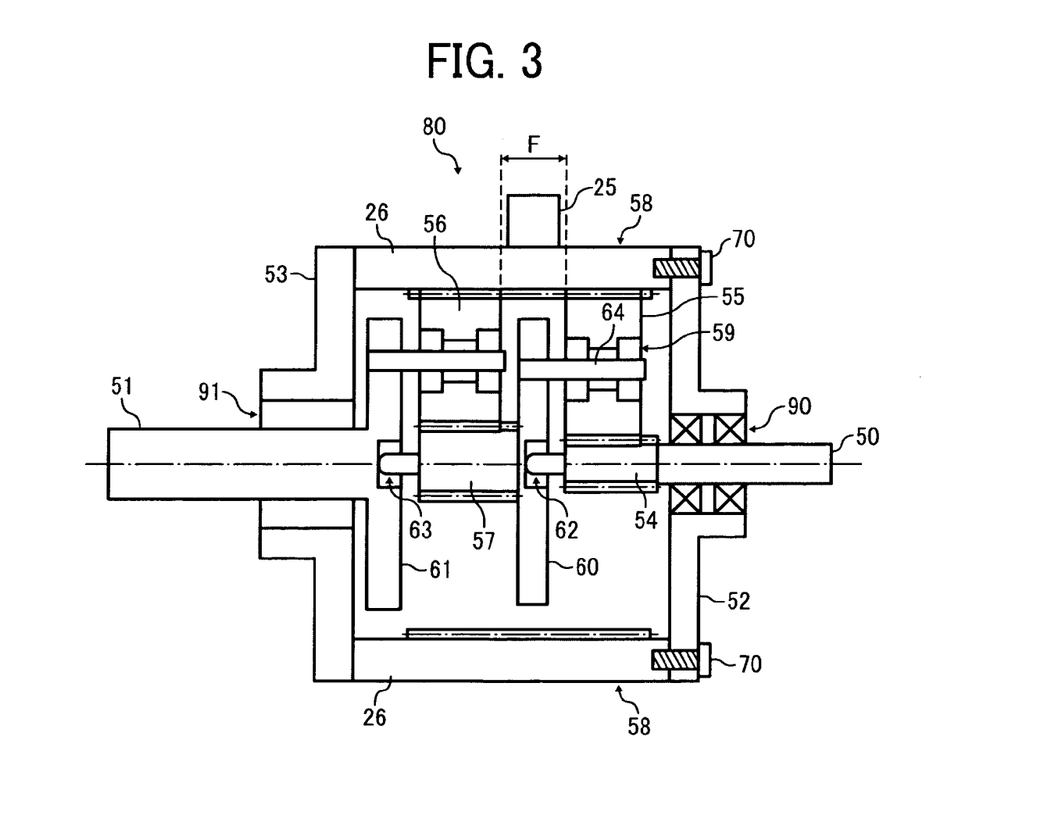
FIG. 3 is a vertical cross-sectional view illustrating an example of a configuration of a two-stage planetary gear deceleration mechanism included in the rotary drive device illustrated in FIG. 2.
Figure 4A:
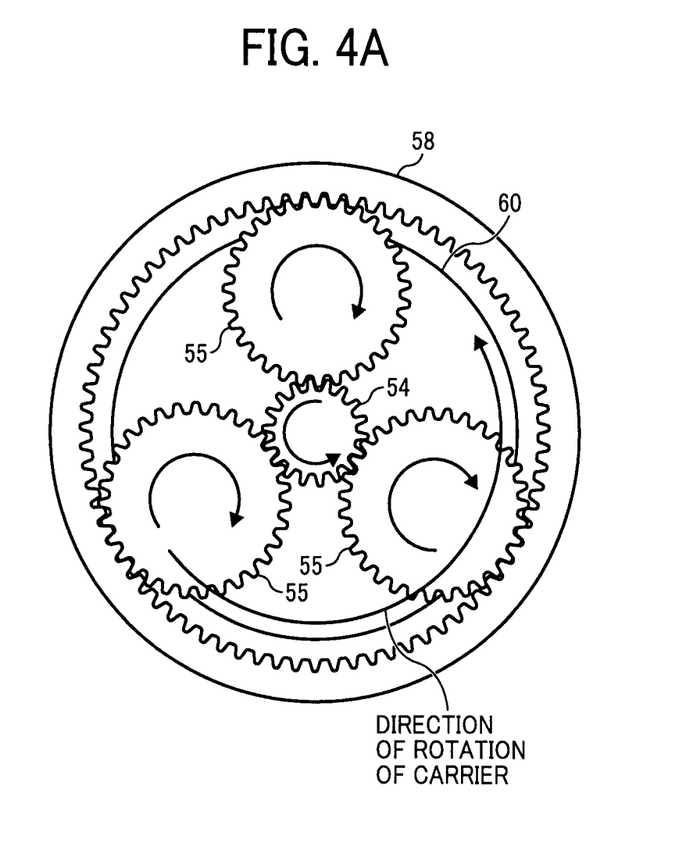
FIGS. 4A and 4B are plan views respectively illustrating examples of configurations of a first stage in the planetary gear deceleration mechanism.
Figure 4B:
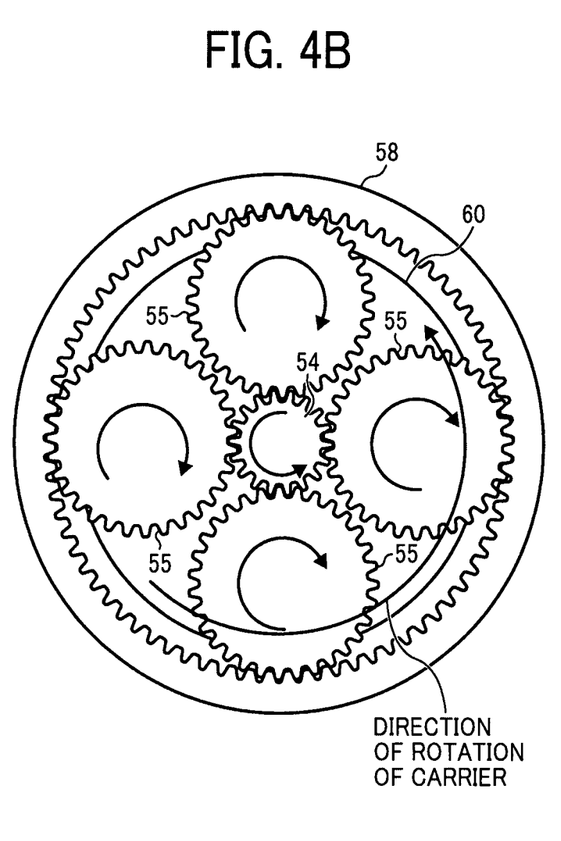

With reference to FIGS. 2 to 4, a description is now given of a configuration and operations of a rotary drive device 10 including a 2KH-type two-stage planetary gear deceleration mechanism 80 according to illustrative embodiments.

It is to be noted that the photoconductors 1 are driven by rotary drive devices 10 having the same configuration, respectively, and the rotary drive devices 10 are applicable not only to the photoconductors 1 but also to other rotary bodies such as the drive roller around which the intermediate transfer belt 5 is wound.

FIG. 2 is an exploded view illustrating an example of configuration of the rotary drive device 10 according to illustrative embodiments. FIG. 3 is a vertical cross-sectional view illustrating an example of a configuration of a two-stage planetary gear deceleration mechanism 80 included in the rotary drive device 10. FIGS. 4A and 4B are plan views respectively illustrating examples of configurations of a first stage in the planetary gear deceleration mechanism 80.

Each stage in an ordinary 2KH-type planetary gear mechanism includes a sun gear, multiple planetary gears, a carrier that supports orbital motion or revolution of the multiple planetary gears around the sun gear, and an annular gear having inward-facing teeth.

One of rotation of the sun gear, revolution of the planetary gears around the sun gear (or rotation of the carrier), and rotation of the annular gear is held stationary, and one of the two remaining components is an input that provides power to the planetary gear mechanism, while the last component is an output that receives power from the mechanism. Setting of multiple deceleration rates and switching of directions of rotation and revolution of the gears are achieved depending on how the above-described three components are assigned.

The 2KH-type two-stage planetary gear mechanism is classified as a compound planetary gear mechanism having multiple 2KH-type planetary gear mechanisms, and each of the multiple 2KH-type planetary gear mechanisms includes three reference shafts. Two of the three reference shafts are coupled to each other while the remaining reference shaft is held stationary. One of the two reference shafts coupled to each other serves as a drive shaft or a driven shaft.

Referring to FIGS. 2 and 3, the rotary drive device 10 includes a motor 73 serving as a drive source, and the motor 73 is coupled to an input shaft 50 of the planetary gear deceleration mechanism 80. One end of the input shaft 50 is provided with a sun gear 54 included in a first stage in the planetary gear deceleration mechanism 80, so that a drive force transmitted from the motor 73 to the input shaft 50 rotates the sun gear 54. In the first stage in the planetary gear deceleration mechanism 80, each of multiple planetary gears 55 is rotatably supported by a shaft 64 of a carrier 60 through a bearing 59 and engages the sun gear 54 to rotate around their own axes. The multiple planetary gears 55 are concentrically arranged at equal intervals within a stationary annular gear 58 having inward-facing teeth for the purpose of equalizing rotary balance and torque distribution. In an example shown in FIG. 4A, the three planetary gears 55 are concentrically provided within the stationary annular gear 58 at equal intervals. By contrast, FIG. 4B shows an example in which the four planetary gears 55 are concentrically provided within the stationary annular gear 58 at equal intervals. It is to be noted that, although the three planetary gears 55 are concentrically arranged at equal intervals within the stationary annular gear 58 as illustrated in FIG. 4A according to illustrative embodiments, the number of planetary gears 55 provided in each stage in the planetary gear deceleration mechanism 80 is not limited thereto.

The stationary annular gear 58 is fixed so as not to be rotatable. While engaging the sun gear 54 to rotate around their own axes, the three planetary gears 55 also engage the stationary annular gear 58 to revolve around the sun gear 54 within the stationary annular gear 58. In other words, each of the planetary gears 55 engages the sun gear 54 in an inner orbit as well as the stationary annular gear 58 in an outer orbit while revolving around the sun gear 54. The carrier 60 that rotatably supports the planetary gears 55 is rotated by revolution of the planetary gears 55 around the sun gear 54 at reduced speed relative to rotation of the sun gear 54, so that a deceleration ratio for the first stage is obtained.

Returning to FIG. 3, a second stage in the planetary gear deceleration mechanism 80 includes a sun gear 57 provided at the center of rotation of the carrier 60 provided in the first stage. Thus, the sun gear 57 is an input in the second stage in the planetary gear deceleration mechanism 80 and is rotated by rotation of the carrier 60. Two rotary supporters 63 having a small clearance therebetween floatingly support the sun gear 57 so that the sun gear 57 is rotatable.

In a manner similar to the first stage in the planetary gear deceleration mechanism 80, the second stage in the planetary gear deceleration mechanism 80 includes three planetary gears 56 rotatably supported by a carrier 61. Each of the planetary gears 56 engages the sun gear 57 to rotate around their own axes. The planetary gears 56 also engage the stationary annular gear 58 provided in the first stage, which is commonly used for both stages, so as to revolve around the sun gear 57 within the stationary annular gear 58. Revolution of the planetary gears 56 rotates the carrier 61 or an output shaft 51 provided to the carrier 61 at further reduced speed.

The deceleration ratio obtained in the 2KH-type planetary gear deceleration mechanism 80 is calculated by Formula 1 below, where the number of teeth of each of the sun gears 54 and 57 is Za, the number of each of the planetary gears 55 and 56 is Zb, and the number of stationary annular gear 58 is Zc. Here, rotation of each of the sun gears 54 and 57 is an input, rotation of each of the carriers 60 and 61 (or revolution of the planetary gears 55 and 56 around the sun gears 54 and 57, respectively) is an output, and the stationary annular gear 58 is held stationary. Suffixes "1" and "2" in Formula 1 below indicate the first and second stages in the planetary gear deceleration mechanism 80, respectively.

$$\text{Deceleration Ratio} = \{Za1/(Za1+Zc1)\} \times \{Za2/(Za2+Zc2)\}$$ [Formula 1]

Because vibration in the stationary annular gear 58 tends to cause banding, it is necessary to prevent the stationary annular gear 58 from being rotated relative to a flange 52 described in detail later. Further, the stationary annular gear 58 is required to be securely fixed to the flange 52 and the image forming apparatus 100 in order to prevent higher-order vibration caused by transmission of gear vibration and motor vibration.

In order to reduce gear vibration during operation, use of helical gears is preferable to that of spur gears. Specifically, use of helical gears increases a contact ratio and reduces load sharing, resulting in smooth engagement and rotation. However, engagement of the helical gears causes a vector in a thrust direction so that the stationary annular gear 58 may be moved in the thrust direction. Therefore, it is necessary to restrict movement of the stationary annular gear 58 in the thrust direction.

As illustrated in FIG. 3, movement of the input shaft 50 and the output shaft 51 in the thrust direction is restricted by a bearing 90 provided to the flange 52 and a bearing 91 provided to an end cap 53, respectively. In addition, a tip of a shaft of the sun gear 54 contacts rotary supporters 62 provided at the center of the carrier 60 and a tip of a shaft of the sun gear 57 contacts the rotary supporters 63 provided at the center of the carrier 61 in order to restrict movement of the carriers 60 and 61 in the thrust direction. The tips of each of the shafts of the sun gears 54 and 57 are curved so as to prevent loss of rotary friction at the rotary supporters 62 and 63.

With use of the above-described planetary gear deceleration mechanism 80, higher accuracy is required for driving the photoconductors 1 with a rotary speed fluctuation rate of about ±0.3% P–P or less in a band between 0 Hz and 200 Hz based on banding generated in images. Thus, compared to an ordinary planetary gear deceleration mechanism for positioning usage, an acceptable rotary speed fluctuation rate required for the planetary gear deceleration mechanism 80 according to illustrative embodiments is an order of magnitude greater.

As illustrated in FIG. 2, a drum shaft 78 that rotatively supports the photoconductor 1 is fixed to one end of the photoconductor 1 in an axial direction. The drum shaft 78 is rotatably supported by a bearing 77 provided to a lateral plate 76 of the image forming apparatus 100, and the torque of the output shaft 51 of the planetary gear deceleration mechanism 80 supported by a sub-lateral plate 74 of the image forming apparatus 100 is transmitted to the drum shaft 78 through a joint 75. The joint 75 is configured such that the drum shaft 78 is easily attached to and detached from the joint 75 upon replacement of the photoconductor 1.

The stationary annular gear 58 of the planetary gear deceleration mechanism 80 is fixed to the flange 52 by screws 70 so as not to be rotated relative to the flange 52. The motor 73 serving as a drive source to drive the photoconductor 1 is provided on one side of the flange 52 opposite the other side of the flange 52 to which the stationary annular gear 58 is fixed. Accordingly, the stationary annular gear 58 is fixed and is not rotatable relative to rotation of the motor 73 by the flange 52.

It is also necessary to fix the planetary gear deceleration mechanism 80 to the image forming apparatus 100. Therefore, the planetary gear deceleration mechanism 80 is fixed to the sub-lateral plate 74 of the image forming apparatus 100 with screws 71 via multiple holders 25 integrally formed with the stationary annular gear 58 on an outer circumferential surface of the stationary annular gear 58.

The holders 25 and insertion portions into which the screws 70 are inserted to fix the stationary annular gear 58 to the flange 52 are positioned outside a range where each of the planetary gears 55 and 56 engage the stationary annular gear 58. Specifically, as illustrated in FIG. 3, the holders 25 are provided on an outer circumferential surface of a cylinder 26 of the stationary annular gear 58 at a portion within a range F, which is the range outside where each of the planetary gears 55 and 56 engages the stationary annular gear 58 in an axial direction. In addition, each of the insertion portions of the screws 70 is restricted so as not to reach the range where the planetary gears 55 engage the stationary annular gear 58 in the axial direction.

The above-described provisions of the holder 25 and the insertion portions of the screws 70 can minimize impact of deformation of the stationary annular gear 58 described in detail later on rotation fluctuation of the planetary gear deceleration mechanism 80.

The number of holders 25 and that of the screws 70 are adjusted to be a non-integer multiple of the number of each of the planetary gears 55 and 56. For example, when the number of each of the planetary gears 55 and 56 provided to the planetary gear deceleration mechanism 80 is three in a manner similar to illustrative embodiments, four holders 25 are provided on the circumferential surface of the cylinder 26 at equal intervals in a circumferential direction of the stationary annular gear 58. Further, insertion holes are provided at four positions to fix the stationary annular gear 58 to the flange 512 with four screws 70. In other words, the number of each of the holders 25 and the screws 70 is set to four, which is a non-integer multiple of the number of each of the planetary gears 55 and 56, that is, three. In turn, the number of portions deformed in the cylinder 26 of the stationary annular gear 58 in the circumferential direction of the stationary annular gear 58 by fastening of the screws 70 and fixing of the planetary gear deceleration mechanism 80 to the sub-lateral plate 74 of the image forming apparatus 100 are reduced to a non-integer multiple of the number of each of the planetary gears 55 and 56. Accordingly, an offsetting effect specific to the planetary gear mechanisms comes into play, so that rotational fluctuation in the planetary gear deceleration mechanism 80 due to deformation of the stationary annular gear 58 caused by provision of the holders 25 and the screws 70 can be reduced.

Further, with regard to molding of the stationary annular gear 58, number of reinforcing ribs formed on the outer circumferential surface of the stationary annular gears 58, number of convexo-concaves generated on the outer circumferential surface of the stationary annular gear 58 by formation of recessed portions (or sinks), and number of pin gates through which resin is injected into a mold are respectively adjusted to be the non-integer multiple of the number of each of the planetary gears 55 and 56 as described in detail later.

Figure 5:
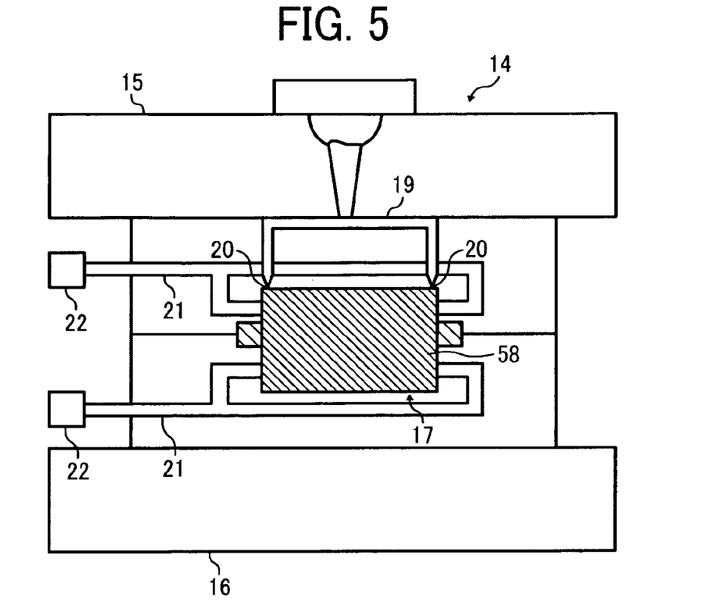
FIG. 5 is a vertical cross-sectional view illustrating an example of a configuration of a mold used for manufacturing a stationary annular gear.
Figure 6:
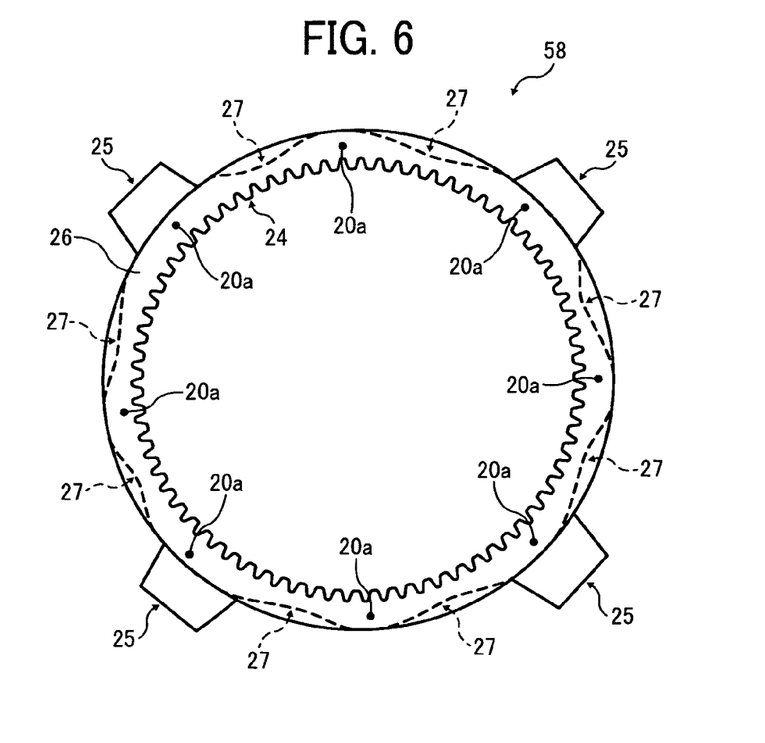
FIG. 6 is a plan view illustrating an example of a configuration of the stationary annular gear formed using the mold illustrated in FIG. 5.

A description is now given of a method for manufacturing the stationary annular gear 58 using injection molding of molten resin and a detailed configuration of the stationary annular gear 58 thus formed. FIG. 5 is a vertical cross-sectional view illustrating an example of a configuration of a mold 14 used for manufacturing the stationary annular gear 58. FIG. 6 is a plan view illustrating an example of a configuration of the stationary annular gear 58 formed using the mold 14.

The mold 14 includes a stationary upper part 15 and a movable lower part 16, and a cavity 17 is formed by a space within the upper part 15 and a space within the lower part 16. The cavity 17 is a cylindrical space into which molten resin is injected. The resin thus injected into the cavity 17 is cooled and solidified to form a cylindrical plastic molded product, that is, the stationary annular gear 58.

The upper part 15 has a channel 19 through which the molten resin is supplied and multiple pin gates 20 from which the molten resin supplied through the channel 19 is injected into the cavity 17.

Each of the upper and lower parts 15 and 16 has multiple holes 21 channeled to the cavity 17 and connected to compressed air suppliers 22, respectively. An inner diameter of an opening of each of the multiple holes 21 provided to the cavity 17 is in a range from 0.001 mm to 0.5 mm.

As illustrated in FIG. 6, the stationary annular gear 58 formed with the mold 14 includes the cylinder 26, a teeth-shaped transfer part 24 formed along an inner circumference of the cylinder 26, and the holders 25 formed on the outer circumferential surface of the cylinder 26. The transfer part 24 corresponds to the inward-facing teeth of the stationary annular gear 58 which is teeth-shaped by transfer of teeth shapes formed on an inner circumferential edge of the cavity 17. Portions formed on an outer circumferential edge of the cavity 17 are transferred to form the holders 25.

Multiple recessed portions (hereinafter referred to as sinks 27) formed by compressed air supplied from the compressed air suppliers 22 through the holes 21 to the cavity 17 are formed radially at equal intervals on the outer circumferential surface of the cylinder 26 of the stationary annular gear 58.

It is to be noted that reference numeral 20a in FIG. 6 denotes a trace of the pin gate 20 through which the molten resin is injected into the cavity 17.

To form the stationary annular gear 58 using the mold 14, first, molten resin supplied through the channel 19 is injected from the pin gates 20 into the cavity 17. The molten resin thus injected into the cavity 17 expands radially around each of the pin gates 20. As a result, the molten resin reaches the inner and outer circumferential edges of the cavity 17 at different timings. Consequently, portions of the cavity 17 where require more time to reach the molten resin, that is, intermediate portions between each of the two adjacent pin gates 20 provided to the cavity 17 at equal intervals in the circumferential direction of the cavity 17, tend to lack the molten resin.

As a result, the transfer part 24 that forms the inward-facing teeth of the stationary annular gear 58 is deformed at the intermediate portions between each of the two adjacent pin gates 20 due to a lack of the molten resin. Thus, the teeth-shaped transfer part 24 is deformed at the number of portions same as the number of pin gates 20 at equal intervals in the circumferential direction of the stationary annular gear 58. Therefore, if the number of pin gates 20 provided to the upper part 15 of the mold 14 is an integer multiple of the number of planetary gears 55 provided within the stationary annular gear 58 at equal intervals in the circumferential direction of the stationary annular gear 58, all of the planetary gears 55 are positioned at the deformed portions in the teeth-shaped transfer part 24 of the stationary annular gear 58, respectively, at the same time while the carrier 60 makes a single rotation within the stationary annular gear 58. Consequently, transmission error caused by irregular engagement of the planetary gears 55 and the stationary annular gear 58 during the single rotation of the carrier 60 occurs simultaneously at each of the planetary gears 55, resulting in large rotary speed fluctuation.

As described above, the stationary annular gear 58 is formed by injecting the molten resin from the number of pin gates 20 which is a non-integer multiple of the number of planetary gears 55. Accordingly, each of the planetary gears 55 is positioned at the deformed portions in the transfer part 24 of the stationary annular gear 58 at different timings while the carrier 60 makes a single rotation within the stationary annular gear 58. As a result, transmission error caused by irregular engagement of the planetary gears 55 and the stationary annular gear 58 during the single rotation of the carrier 60 does not occur simultaneously at each of the planetary gears 55, thereby reducing rotary speed fluctuation.

Thus, the number of pin gates 20 is adjusted to be a non-integer multiple of the number of planetary gears 55 included in the first stage in the planetary gear deceleration mechanism 80 according to illustrative embodiments. Deformation in the teeth-shaped transfer part 24 of the stationary annular gear 58 due to a lack of the molten resin also causes irregular engagement of the planetary gears 56 included in the second stage and the stationary annular gear 58, resulting in transmission error. Therefore, in a manner similar to the first stage in the planetary gear deceleration mechanism 80 described above, the number of pin gates 20 is also adjusted to be a non-integer multiple of the number of planetary gears 56 included in the second stage.

When the traces 20a of the pin gates 20 are formed in the cylinder 26 of the stationary annular gear 58 at portions facing the pin gates 20 during formation of the stationary annular gear 58, the sinks 27 are formed at the intermediate portions between each of the two adjacent pin gates 20.

A method described below is employed in order to prevent formation of the sinks 27 in the teeth-shaped transfer part 24 of the stationary annular gear 58.

The molten resin injected into the cavity 17 is gradually cooled and solidified over time. When a pressure on the resin reaches a predetermined value during cooling and solidification of the resin, the compressed air suppliers 22 are driven to blow compressed air into the cavity 17 from the holes 21 formed at portions in the cavity 17 opposite the outer circumferential surface of the cylinder 26. Thus, the sinks 27 are formed at portions on the outer circumferential surface of the cylinder 26 corresponding to the holes 21.

As a result, an amount of the molten resin corresponding to a volume of each of the sinks 27 thus formed is moved and additionally supplied to the outer and inner circumferential edges of the cavity 17. Specifically, the sinks 27 are formed on the outer circumferential surface of the cylinder 26 of the stationary annular gear 58 at the intermediate portions between each of the two adjacent pin gates 20 where arrival time of the molten resin injected into the cavity 17 tends to be delayed and the amount of the molten resin supplied tends to lack. Therefore, those portions where the molten resin tends to lack are filled with the amount of the molten resin thus moved and supplied by formation of the sinks 27.

Accordingly, the molten resin is evenly supplied to the inner and outer circumferential edges of the cavity 17 so that unevenness or deformation in the holders 25 and the teeth-shaped transfer part 24 respectively formed on the outer and inner circumferential surfaces of the cylinder 26 of the stationary annular gear 58 can be prevented, thereby providing the stationary annular gear 58 having the accurately formed transfer part 24 and the holders 25.

Time to drive the compressed air suppliers 22 and to output the compressed air is adjusted to appropriately control an amount of the compressed air to be supplied and time to supply the compressed air, so that a depth and a size of each of the sinks 27 can be adjusted. Accordingly, the volume of each of the sinks 27 can be controlled, thereby adjusting the amount of the molten resin to be moved and additionally supplied to the inner and outer circumferential edges of the cavity 17. As a result, unevenness or deformation in the holders 25 and the transfer part 24 respectively formed on the outer and inner circumferential surfaces of the cylinder 26 of the stationary annular gear 58 can be reliably prevented. Thus, the stationary annular gear 58 having the more accurately formed transfer part 24 and the holders 25 is obtained.

It is to be noted that the inner diameter of each of the holes 21 is as small as the range from 0.001 mm to 0.5 mm as described above. Accordingly, the molten resin injected into the cavity 17 does not enter the holes 21, thereby preventing burr caused by entrance of the molten resin into the holes 21.

Figure 7:
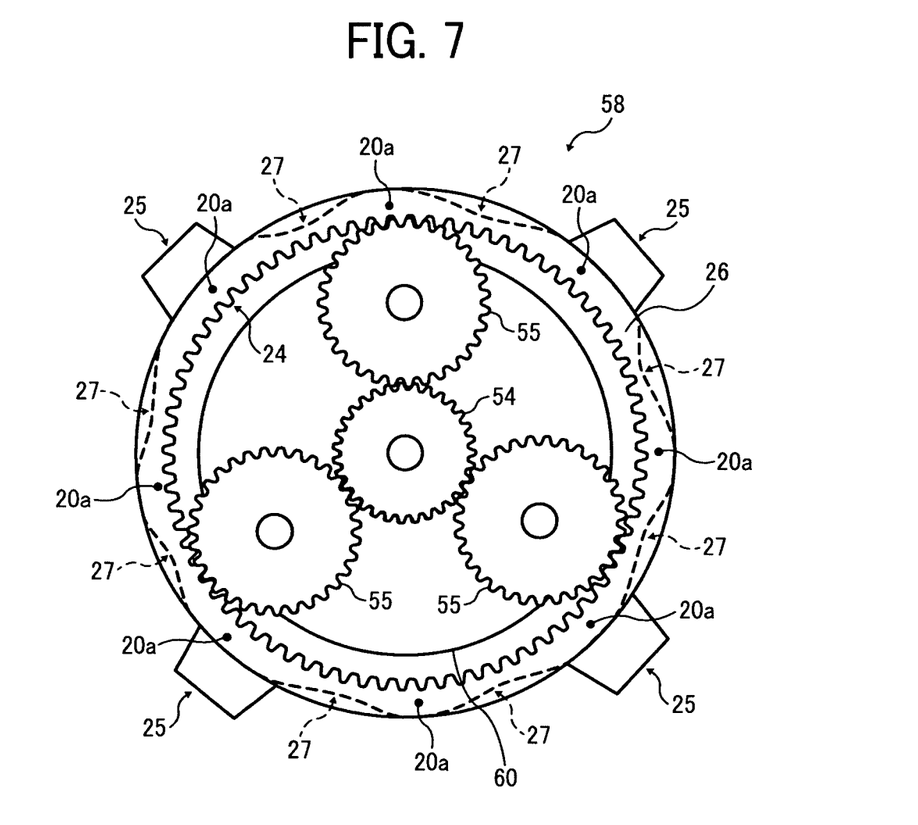
FIG. 7 is a plan view illustrating an example of a configuration of the first stage in the planetary gear deceleration mechanism including the stationary annular gear formed using the mold illustrated in FIG. 5.

FIG. 7 is a plan view illustrating an example of a configuration of the first stage in the planetary gear deceleration mechanism 80 including the stationary annular gear 58 formed using the mold 14.

As described previously, the number of pin gates 20 provided to the mold 14 in the circumferential direction of the cavity 17 (or the cylinder 26 of the stationary annular gear 58) is eight, which is a non-integer multiple of the number of each of the planetary gears 55 and 56, that is, three. Further, the number of sinks 27 formed on the outer circumferential surface of the cylinder 26 in the circumferential direction thereof is eight, which is also a non-integer multiple of the number of each of the planetary gears 55 and 56, that is, three. Accordingly, number of portions in the cylinder 26 in the circumferential direction thereof deformed by slightly irregular transfer and uneven thickness of the resin in the cylinder 26 after formation even when the transfer part 24 is accurately formed is adjusted to be a non-integer multiple of the number of each of the planetary gears 55 and 56.

The multiple holders 25 are integrally formed with the stationary annular gear 58 on the outer circumferential surface of the stationary annular gear 58 by injection molding as described above, such that the holders 25 extend outward from the stationary annular ear 58. Consequently, the stationary annular gear 58 is deformed due to uneven thickness thereof in the circumferential direction.

There is a difference of about from 5 mm to 10 mm in the thickness of the stationary annular gear 58 throughout the circumferential direction thereof depending on shapes in portions of the stationary annular gear 58. Therefore, time to cool the molten resin after injection differs at each portion of the stationary annular gear 58, thereby causing a difference in curvature depending on the thickness in the stationary annular gear 58. The difference in curvature and a degree of deformation of the stationary annular gear 58 vary considerably depending on characteristics of resin, surrounding temperature, temperature distribution, or the like. Although it is very difficult to precisely describe the degree of deformation, the cylinder 26 of the stationary annular gear 58 tends to be deformed from a perfect circle to an imperfect circle when the number of holders 25 is three, and tends to be deformed from a perfect circle to a square when the number of holders 25 is four.

One conceivable way to prevent deformation of the stationary annular gear 58 due to the difference in thickness is slower cooling of the molten resin injected into the cavity 17. However, even though proving the accurately-formed stationary annular gear 58, slower cooling of the molten resin requires more time to manufacture the stationary annular gear 58, thereby causing decrease in productivity and thus a cost increase. Therefore, a certain degree of deformation in the stationary annular gear 58 is tolerated to achieve higher productivity and lower production costs.

Classification demanded for the stationary annular gear 58 is JIS class 4 or greater. The stationary annular gear 58 is formed of a viscous resin material having an appropriate Young's modulus value smaller than that of metal or engineering plastics, thereby achieving higher accuracy and less gear vibration.

To achieve higher quality resin formation, it is important to make the stationary annular gear 58 as small as possible without deformation so that fluidity of the molten resin in the cavity 17 during formation is improved. Further, it is important to reduce uneven thickness in a shape of the stationary annular gear 58 in order to prevent partial shrinkage.

However, because the stationary annular gear 58 thus formed with higher accuracy tends to be thin, it is easily deformed by stress during installation or operation. Consequently, the cylinder 26 of the stationary annular gear 58 is deformed in the circumferential direction thereof due to direct mechanical stress caused by screw fastening or swaging, thereby degrading rotational accuracy during operations.

Assuming that rotational fluctuation caused by deterioration in rotational accuracy is generated N times per second, the rotational fluctuation occurs in a frequency of V/N mm in an image output by a print speed of V mm/s, thereby causing an irregular image including uneven image density or banding.

Thus, as described previously, the number of holders 25 provided on the outer circumferential surface of the cylinder 26 in the circumferential direction of the stationary annular gear 58 is adjusted to be four, which is a non-integer multiple of the number of each of the planetary gears 55 and 56, that is, three. In turn, the number of portions deformed in the stationary annular gear 58 in the circumferential direction thereof during formation is reduced to four, which is a non-integer multiple of the number of each of the planetary gears 55 and 56, that is, three. As a result, the three planetary gears 55 position at the deformed portions in the stationary annular gear 58 at different timings, respectively, while the carrier 60 makes a single rotation, and the three planetary gears 56 position at the deformed portions in the stationary annular gear 58 at different timings, respectively, while the carrier 61 makes a single rotation. Thus, simultaneous occurrence of rotation transmission errors at each of the planetary gears 55 and 56 caused by irregular engagement of the stationary annular gear 58 and each of the planetary gears 55 and 56 while the carriers 60 and 61 respectively make a single rotation can be prevented, thereby reducing rotary speed fluctuation.

Figure 8:
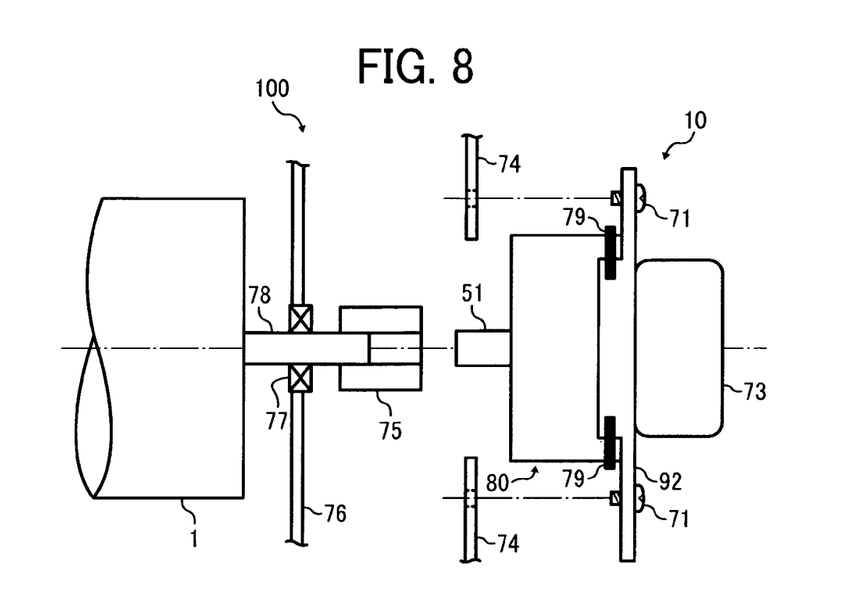
FIG. 8 is an exploded view illustrating an example of a configuration of a rotary drive device according to a variation of illustrative embodiments.
Figure 9:
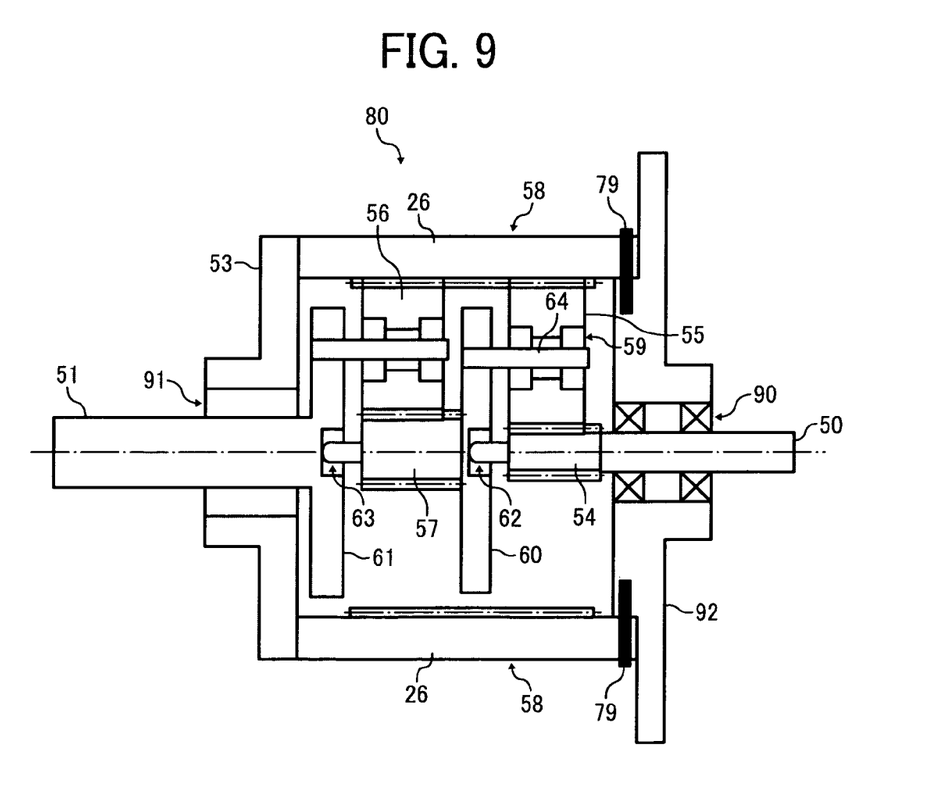
FIG. 9 is a vertical cross-sectional view illustrating an example of a configuration of a two-stage planetary gear deceleration mechanism included in the rotary drive device illustrated in FIG. 8.

A description is now given of a variation of the foregoing illustrative embodiments with reference to FIGS. 8 and 9. FIG. 8 is an exploded view illustrating an example of a configuration of the rotary drive device 10 according to the variation. FIG. 9 is a vertical cross-sectional view illustrating an example of a configuration of the two-stage planetary gear deceleration mechanism 80 included in the rotary drive device 10 illustrated in FIG. 8. In the variation, pins 79 are used in place of the screws 70 to fix the stationary annular gear 58 to a flange 92 which corresponds to the flange 52 of the foregoing illustrative embodiments.

Multiple insertion holes into which the pins 79 are inserted are provided at portions closer to the motor 73 on the outer circumferential surface of the cylinder 26 of the stationary annular gear 58 at equal intervals in the circumferential direction thereof. The multiple insertion holes pass through the cylinder 26 so as to connect to multiple holes provided on the flange 92 corresponding to the multiple insertion holes. The pins 79 are inserted into the insertion holes from the outer circumferential surface of the cylinder 26 to the holes provided on the flange 92 so as to fix the stationary annular gear 58 to the flange 92. Accordingly, the stationary annular gear 58 is prevented from rotating relative to the flange 92. The flange 92 is fixed to the sub-lateral plate 74 of the image forming apparatus 100 with the screws 71 to be prevented from being rotated by a rotary force applied to the flange 92 from the stationary annular gear 58.

As described above, each of the pins 79 is inserted in both the insertion hole provided on the cylinder 26 of the stationary annular gear 58 and the hole provided on the flange 92 to fix the stationary annular gear 58 to the flange 92 without looseness. Thus, the pins 79 prevent not only rotation of the stationary annular gear 58 but also movement of the stationary annular gear 58 in the thrust direction in a case in which a helical gear is used.

The number of each of the pins 79 and the insertion holes (or the holes) provided on the cylinder 26 of the stationary annular gear 58 (or the flange 92) is adjusted to be four, which is the non-integer multiple of the number of each of the planetary gears 55 and 56, that is, three. Accordingly, the number of portions in the stationary annular gear 58 deformed in the circumferential direction thereof by insertion of the pins 79 into the insertion holes is adjusted to be four, which is the non-integer multiple of the number of each of the planetary gears 55 and 56. As a result, impact on rotational fluctuation in the planetary gear deceleration mechanism 80 due to deformation in the stationary annular gear 58 caused by insertion of the pins 79 into the insertion holes can be minimized.

As described previously, portions around the insertion holes in the cylinder 26 of the stationary annular gear 58 are deformed when the pins 79 are inserted into the insertion holes. Consequently, the stationary annular gear 58 is deformed at the number of portions at equal intervals in the circumferential direction thereof same as the number of insertion holes provided on the stationary annular gear 58. Therefore, if the number of insertion holes in the stationary annular gear 58 is an integer multiple of the number of each of the planetary gears 55 and 56 provided within the stationary annular gear 58 at equal intervals in the circumferential direction, the planetary gears 55 or 56 respectively position at the deformed portions of the stationary annular gear 58 at the same time while the carrier 60 or 61 makes a single rotation within the stationary annular gear 58. Consequently, transmission error caused by irregular engagement of the stationary annular gear 58 and the planetary gears 55 or 56 during the single rotation of the carrier 60 or 61 occurs simultaneously at each of the planetary gears 55 or 56, resulting in large rotary speed fluctuation.

Therefore, as described above, the number of insertion holes provided on the cylinder 26 of the stationary annular gear 58 is adjusted to be a non-integer multiple of the number of each of the planetary gears 55 and 56. Accordingly, each of the planetary gears 55 and 56 is positioned at the deformed portions of the stationary annular gear 58 at different timings while the carriers 60 and 61 makes a single rotation Within the stationary annular gear 58, respectively. As a result, transmission error caused by irregular engagement of the stationary annular gear 58 and each of the planetary gears 55 and 56 during the single rotation of the carriers 60 and 61 does not occur simultaneously at each of the planetary gears 55 and 56, thereby reducing rotary speed fluctuation.

Advantages of the above-described method for fixing the stationary annular gear 58 to the flange 92 using the pins 79 are described in detail below.

Deformation in the stationary annular gear 58 occurs not only when the screws are fastened but also over time depending on environmental changes. In particular, thermal expansion of the resin material due to changes in temperature and humidity causes considerable deformation in the stationary annular gear 58. Although a normal temperature within the image forming apparatus 100 is 20° C., the temperature is increased to about 50° C. or higher due to heat release from the fixing device 8.

As illustrated in FIG. 2, in the case in which the stationary annular gear 58 formed of the resin material is fixed to the flange 52 and the sub-lateral plate 74 both formed of metal such as stainless steel with the screws 70 and 71, thermal expansion of the stationary annular gear 58 is kept by the screws 70 and 71 due to a difference in a coefficient of thermal expansion between the resin and the metal. Consequently, portions where the stationary annular gear 58 is fixed to the flange 52 and the sub-lateral plate 74 with the screws 70 and 71, respectively, are considerably deformed depending on thermal expansion of the stationary annular gear 58.

As described above, the number of deformed portions in the stationary annular gear 58 is adjusted to be a non-integer multiple of the number of each of the planetary gears 55 and 56 in order to prevent impact on rotation property of the planetary gear deceleration mechanism 80. However, large deformation in the stationary annular gear 58 due to large environmental changes may adversely affect the rotation property of the planetary gear deceleration mechanism 80. To solve the above-described impact, in the variation of the foregoing illustrative embodiments, the pins 79 are used for preventing deformation in the stationary annular gear 58 caused by thermal expansion at the portions where the screws 79 are provided as well as for securely fixing the stationary annular gear 58 to the flange 92. In addition, use of the pins 79 inserted from the outer circumferential surface of the cylinder 26 of the stationary annular gear 58 does not prevent changes in thermal expansion in the stationary annular gear 58.

A description is now given of effectiveness of the foregoing illustrative embodiments based on experimental data. Table 1 below shows the number of teeth and modules for each gear in the planetary gear deceleration mechanism 80 according to illustrative embodiments. Further, rotary speed [rpm] and rotary frequency [Hz] of the carriers and gears when the motor 73 is driven at 1,200 rpm are shown in Table 1.

TABLE 1

|  | Rotary Speed [rpm] | Rotary Frequency [Hz] | Number of teeth | Module |
| --- | --- | --- | --- | --- |
| Sun Gear | 1,200 | 20.00 | 17 | 0.4 |
| Planetary Gear | 542 | 9.03 | 31 | 0.4 |
| Stationary Annular Gear | 0 | 0 | 79 | 0.4 |
| Carrier | 213 | 3.54 | — | — |

In the experiments, for ease of explanation, a 2KH-type one-stage deceleration mechanism, which has less components and factors for rotational fluctuation than a 2KH-type two-stage deceleration mechanism has, was used as a representative example of the planetary gear deceleration mechanism 80 to more clearly show effectiveness of the foregoing illustrative embodiments. The same effects as those obtained by the 2KH-type one-stage deceleration mechanism can be achieved by the 2KH-type two-stage deceleration mechanism.

In the first experiment, the three planetary gears 55 were provided to the planetary gear deceleration mechanism 80, and the three holders 25 were provided on the outer circumferential surface of the stationary annular gear 58. The stationary annular gear 58 used in the first experiment was formed using the mold 14 having the six pin gates 20, and the six sinks 27 were formed on the outer circumferential surface of the stationary annular gear 58.

Figure 10:
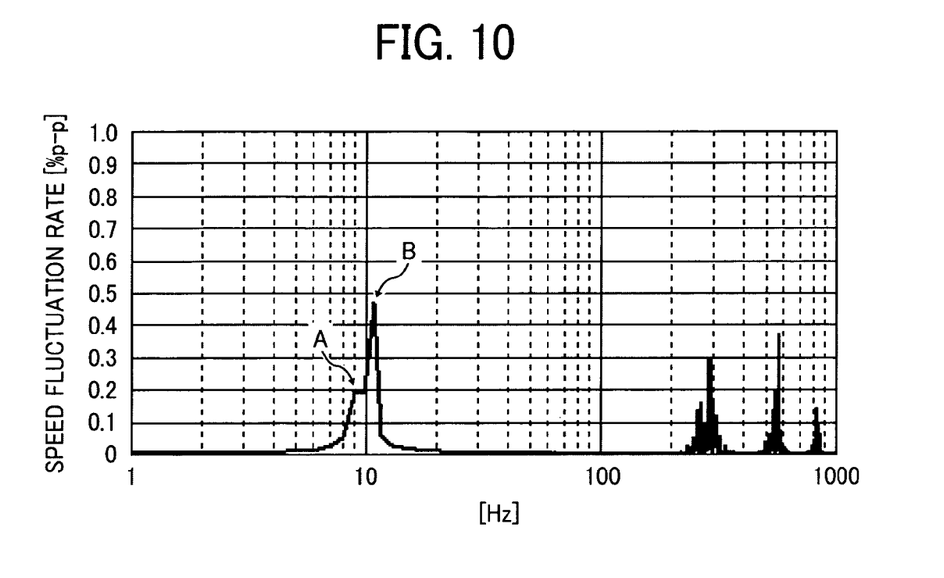
FIG. 10 is a graph showing an example of a speed fluctuation rate of the planetary gear deceleration mechanism.

Three cycles of transmission error occurred while the carrier 60 made a single rotation within the stationary annular gear 58 due to formational error or deformation upon installment of the stationary annular gear 58. FIG. 10 is a graph showing a speed fluctuation rate (% pp) of the output shaft 51 of the planetary gear deceleration mechanism 80 used in the first experiment based on frequency analysis.

As shown in FIG. 10, large rotary speed fluctuation occurred twice in the first experiment. Specifically, first rotary speed fluctuation due to eccentric error of the planetary gears 55 occurred at 9 Hz, which is the first-order element of rotation of the planetary gears 55 (point A in FIG. 10 and subsequent graphs). Second rotary speed fluctuation occurred at 10.6 Hz, which is the third-order element of rotation of the carrier 60 (point B in FIG. 10 and subsequent graphs). Transmission error occurred at each of the three planetary gears 55 at the same phase during engagement with the stationary annular gear 58 made the second rotary speed fluctuation larger.

In the second experiment, the three planetary gears 55 were provided to the planetary gear deceleration mechanism 80, and the four holders 25 were provided on the outer circumferential surface of the stationary annular gear 58. The stationary annular gear 58 used in the second experiment was formed using the mold 14 having the eight pin gates 20, and the eight sinks 27 were formed on the outer circumferential surface of the stationary annular gear 58.

Figure 11:
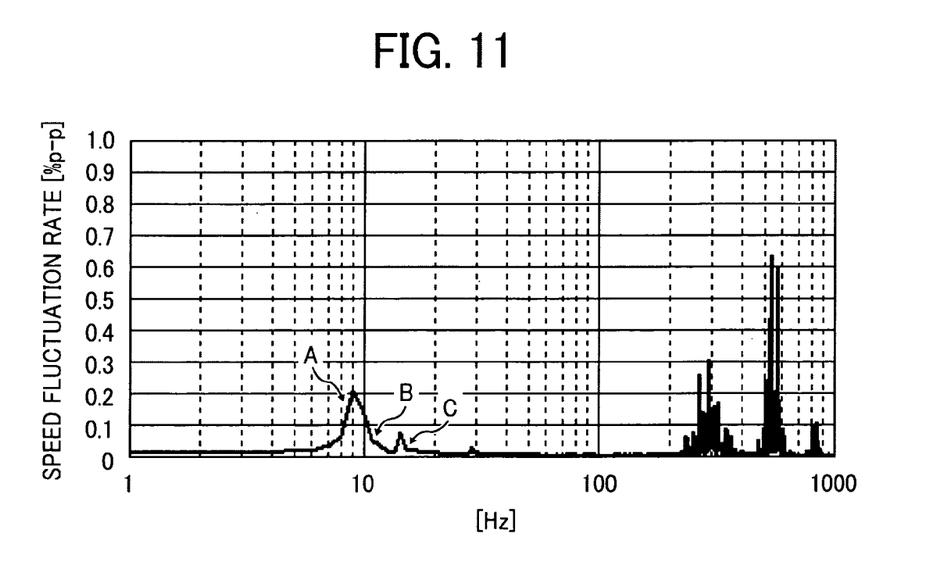
FIG. 11 is a graph showing another example of a speed fluctuation rate of the planetary gear deceleration mechanism.

Four cycles of transmission error occurred while the carrier 60 made a single rotation within the stationary annular gear 58 due to formational error or deformation upon installment of the stationary annular gear 58. It is to be noted that an amount of transmission error was almost the same throughout the cycles in the second experiment. FIG. 11 is a graph showing a rotary speed fluctuation rate of the output shaft 51 of the planetary gear deceleration mechanism 80 used in the second experiment.

Although a rotary speed fluctuation rate generated by the first-order element of rotation of the planetary gears 55 (point A in FIG. 11) was almost the same as that in the first experiment, rotary speed fluctuation caused by the third-order element of rotation of the carrier 60 (point B in FIG. 11) hardly occurred in the second experiment. In addition, the fourth-order element of rotation of the carrier 60 (point C in FIG. 11 and subsequent graphs) only caused slight rotary speed fluctuation. In the second experiment, transmission error occurred at each of the three planetary gears 55 at different phases upon engagement with the stationary annular gear 58. Thus, transmission error was compensated among the three planetary gears 55 to reduce the fourth-order element of rotation of the carrier 60.

Figure 12:
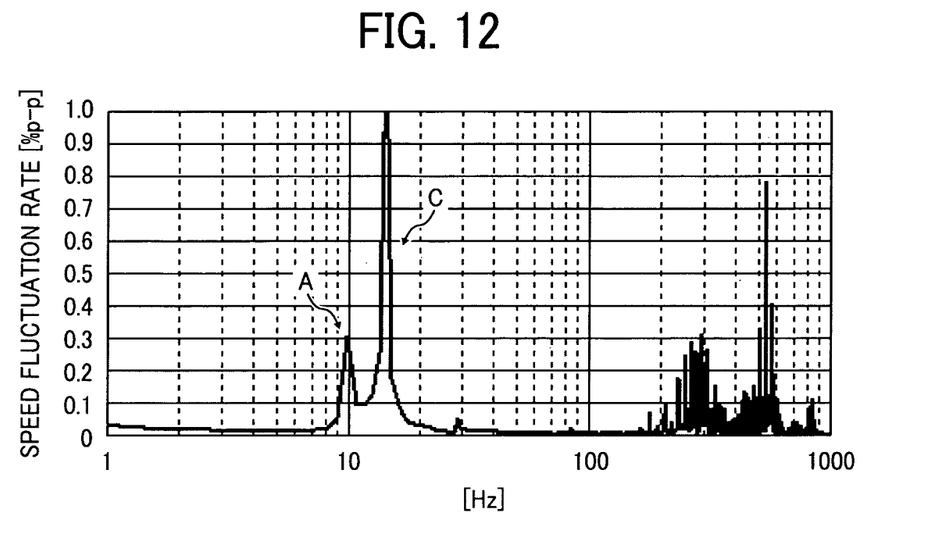
FIG. 12 is a graph showing yet another example of a speed fluctuation rate of the planetary gear deceleration mechanism.
Figure 13:
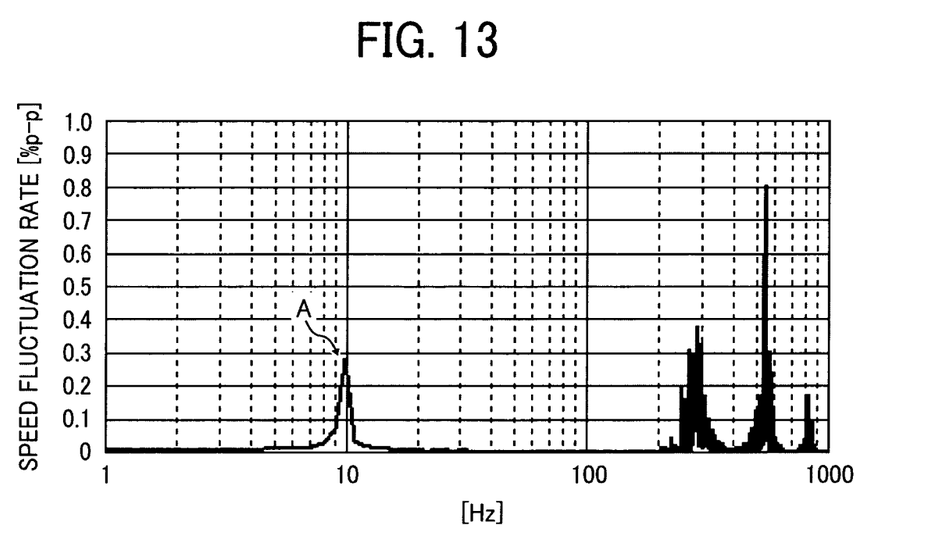
FIG. 13 is a graph showing still yet another example of a speed fluctuation rate of the planetary gear deceleration mechanism.

In the third experiment, the four planetary gears 55 were provided to the planetary gear deceleration mechanism 80, and four cycles of transmission error occurred while the carrier 60 made a single rotation within the stationary annular gear 58. FIG. 12 is a graph showing a rotary speed fluctuation of the output shaft 51 of the planetary gear deceleration mechanism 80 used in the third experiment. Meanwhile, in the fourth experiment, the four planetary gears 55 were provided to the planetary gear deceleration mechanism 80, and three cycles of transmission error occurred while the carrier 60 made a single rotation within the stationary annular gear 58. FIG. 13 is a graph showing a rotary speed fluctuation rate of the output shaft 51 of the planetary gear deceleration mechanism 80 used in the fourth experiment. It is clear from FIGS. 12 and 13 that occurrence of rotary speed fluctuation due to the third-order and fourth-order elements of rotation of the carrier 60 was prevented to achieve high rotational accuracy in the fourth experiment compared to the third experiment.

Thus, it was found that when the stationary annular gear 58 having the number of cycles of transmission error same as the number of planetary gears 55 is used, rotational fluctuation occurs depending on the number of cycles of transmission error. By contrast, use of the stationary annular gear 58 having the number of cycles of transmission errors different from the number of planetary gears 55 prevents occurrence of rotational fluctuation.

It was also found that rotational fluctuation occurs depending on the number of cycles of transmission error when the number of cycles of transmission error in the stationary annular gear 58 is an integer multiple of the number of planetary gears 55. In addition, rotational fluctuation is reduced when the number of cycles of transmission error in the stationary annular gear 58 is a non-integer multiple of the number of planetary gears 55.

Thus, the number of each of the holders 25, the screws 70, the pins 79, the pin gates 20, the sinks 27, and so forth, each causing transmission error in the stationary annular gear 58, is required to be a non-integer multiple of the number of each of the planetary gears 55 and 56. Further, it is preferable that the holders 25, the screws 70, and the pins 79 be positioned outside the range where each of the planetary gears 55 and 56 engage the stationary annular gear 58, thereby reducing transmission error.

It is to be noted that illustrative embodiments of the present invention are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

What is claimed is:

1. A rotary drive device to drive a rotary body included in an image forming apparatus, the rotary drive device comprising:
a drive source; and
a planetary gear mechanism to control torque from the drive source,
the planetary gear mechanism comprising:
a sun gear rotated by the torque from the drive source;
an annular gear coaxial to the sun gear, having inward-facing teeth;
multiple planetary gears provided within the annular gear at equal intervals along a circumference of the annular gear, the multiple planetary gears engaging both the sun gear and the annular gear; and
a carrier rotatable coaxially to the sun gear and the annular gear to rotatably support the multiple planetary gears,
the annular gear being formed by injecting molten resin into a mold having a cylindrical cavity with teeth shapes along an inner circumference of the cavity from multiple pin gates provided to the mold at equal intervals along a circumference of the cavity,
a number of pin gates being a non-integer multiple of a number of planetary gears.

2. The rotary drive device according to claim 1, wherein recessed portions are formed in an outer circumferential surface of the annular gear at equal intervals along the circumference of the annular gear,
a number of recessed portions thus formed being a non-integer multiple of the number of planetary gears.

3. The rotary drive device according to claim 1, wherein holders are integrally formed in an outer circumferential surface of the annular gear at equal intervals along the circumference of the annular gear,
a number of holders being a non-integer multiple of the number of planetary gears.

4. The rotary drive device according to claim 3, wherein:
the planetary gear mechanism includes a first stage of multiple planetary gears and a second stage of multiple planetary gears, each provided within the annular gear in an axial direction of the annular gear; and
the holders are positioned outside ranges where the first stage of the multiple planetary gears engage the annular gear and where the second stage of the multiple planetary gears engage the annular gear.

5. The rotary drive device according to claim 1, further comprising a flange,
wherein:
the drive source and the planetary gear mechanism are fixed to each other via the flange with fasteners; and
holes into which the fasteners are inserted are provided to the annular gear at equal intervals along the circumference of the annular gear,
a number of holes being a non-integer multiple of the number of planetary gears.

6. The rotary drive device according to claim 5, wherein the holes are positioned outside a range where the multiple planetary gears engage the annular gear.

7. The rotary drive device according to claim 5, wherein the fasteners are screws.

8. The rotary drive device according to claim 5, wherein the fasteners are pins.

9. An image forming apparatus comprising:
a rotary body; and
a rotary drive device to drive the rotary body, the rotary drive device comprising:
a drive source; and
a planetary gear mechanism to control torque from the drive source, the planetary gear mechanism comprising:
a sun gear rotated by the torque from the drive source;
an annular gear coaxial to the sun gear, having inward-facing teeth;
multiple planetary gears provided within the annular gear at equal intervals along a circumference of the annular gear, the multiple planetary gears engaging both the sun gear and the annular gear; and
a carrier rotatable coaxially to the sun gear and the annular gear to rotatably support the multiple planetary gears,
the annular gear being formed by injecting molten resin into a mold having a cylindrical cavity with teeth shapes along an inner circumference of the cavity from multiple pin gates provided to the mold at equal intervals along a circumference of the cavity,
a number of pin gates being a non-integer multiple of a number of planetary gears.

10. The image forming apparatus according to claim 9, further comprising a process unit detachably attachable to the image forming apparatus, the process unit comprising an image carrier and at least one of a charger, a developing device, and a cleaning device,
wherein the image carrier is the rotary body.

* * * * *